United States Patent [19]

Telfer

[11] 4,449,600

[45] May 22, 1984

[54] MOBILE CRANES OR AERIAL LIFT PLATFORMS

[75] Inventor: James D. Telfer, Sunderland, Great Britain

[73] Assignee: Coles Cranes Limited, England

[21] Appl. No.: 297,283

[22] Filed: Aug. 27, 1981

[30] Foreign Application Priority Data

Sep. 3, 1980 [GB] United Kingdom ................. 8028470

[51] Int. Cl.³ ............................................ B62D 21/14
[52] U.S. Cl. ................................... 180/132; 180/155; 280/80 R; 280/95 R; 280/638
[58] Field of Search ................. 180/132, DIG. 2, 948, 180/159; 900, 906, 154, 156, 157, 158, 70 R; 280/80 R, 90, 95 R, 638; 74/388 PS

[56] References Cited

U.S. PATENT DOCUMENTS

| | | | |
|---|---|---|---|
| 2,173,419 | 9/1939 | Johnson | 280/80 R |
| 3,229,992 | 1/1966 | Traywick | 280/95 R |
| 3,782,491 | 1/1974 | Herbenar | 180/DIG. 2 |
| 3,964,565 | 6/1976 | Cagle et al. | 280/638 X |
| 4,359,123 | 11/1982 | Haupt et al. | 180/159 |

FOREIGN PATENT DOCUMENTS 209724  6/1960  Austria ................................ 280/638

*Primary Examiner*—Joseph F. Peters, Jr.
*Assistant Examiner*—Mitchell J. Hill
*Attorney, Agent, or Firm*—Townsend and Townsend

[57] ABSTRACT

The invention relates to a mobile crane or aerial lift platform vehicle wherein at least one of the axles is extendable and wherein a cylindrical housing carries the extendable axle beam and a steering actuator is carried on at least one of the beams and is connected to a steering link connected between the wheel and the outer end of the beam. The arrangement is such that the distance between the actuator and the steering link is not altered by extension or contraction of the beam relative to its housing.

13 Claims, 2 Drawing Figures

MOBILE CRANES OR AERIAL LIFT PLATFORMS

BACKGROUND OF THE INVENTION

This invention relates to aerial lift platforms or cranes mounted on a mobile chassis and carrying an extendable boom.

The increasing demand for machines with greater outreach throughout 360° rotation has resulted in the use of extending axles or outriggers (depending on the requirement for fully mobile or fixed base operation) to improve the stability base when the rotating upper structure is normal to the longitudinal axis of the chassis.

This has led to a problem with the steering linkage on the chassis base which has not heretofore been resolved efficiently and safely.

It is recognised with both aerial lifting platforms and cranes that when a boom on the rotating upper structure is in a position at 90° to the chassis longitudinal axis, that the overturning moment of the boom together with the load lifted on the crane, or on the boom plus basket for lift platforms, reaches a maximum value because of the relative width to length of the chassis base.

Previously, improvement in operation over the side of the chassis has been achieved by the use of extending axles or extending outriggers. When it is necessary to achieve full mobility of the machine for all positions of the boom, then extending axles have been used for the purpose.

To utilise extending axles efficiently, the steering geometry and linkage must compensate for the change in position of the wheels owing to the axle extension.

Previously this has been achieved with the use of a large number of components and consequently some of the bracketry has been positioned forward of the axle in a vulnerable position which could affect the safety of the machine.

Steering linkage which may be telescopic is normally held in position, at its minimum and maximum extension, by pins located at suitable positions in the drag rods.

SUMMARY OF THE INVENTION

A vehicle in accordance with this invention carrying a boom or jib for a crane or aerial lifting platform, has extendible axle(s) comprising a cylindrical housing carrying extendible axle beams one at each side, a steering actuator, e.g. a hydraulic piston cylinder, being carried on at least one of the beams with its mounting bracket preferably extending out through a slot in the wall of the housing, the cylinder (or piston) being thus pivotally connected between the steering link and beam so its position is not altered by extension or contraction of the beam relative to the housing.

This means that the only adjustment, other than actuation of the ram to drive the axle beams "in" and/or "out", is the pinning of the track rod in the contracted or extended position resulting in a very much easier adjustment than has hitherto been possible.

BRIEF DESCRIPTION OF THE DRAWINGS

The invention will now be further described by way of example, with reference to the accompanying drawings in which.

DETAILED DESCRIPTION OF THE PREFERRED EMBODIMENT

Figure 1:
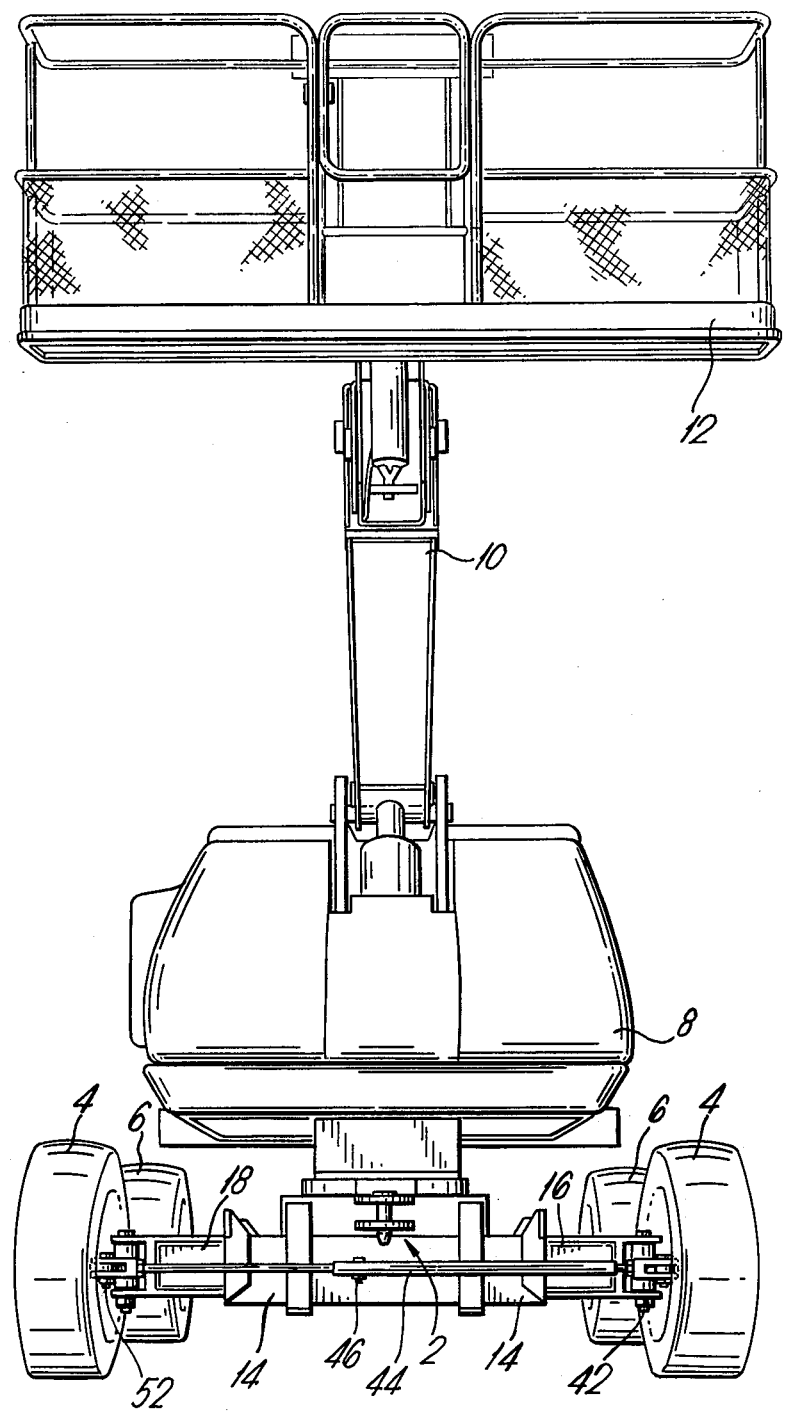
FIG. 1 is a front view of one embodiment of a mobile lift or access platform vehicle in accordance with the invention.

Referring to FIG. 1, the vehicle comprises a chassis generally indicated at 2 mounted on front wheels 4 and rear wheels 6. The rear wheels are driven to drive the vehicle.

A platform 8 is pivotally mounted on the chassis and carries a telescopically extensible boom 10 which iself carries an access platform 12 at its outer end.

Figure 2:
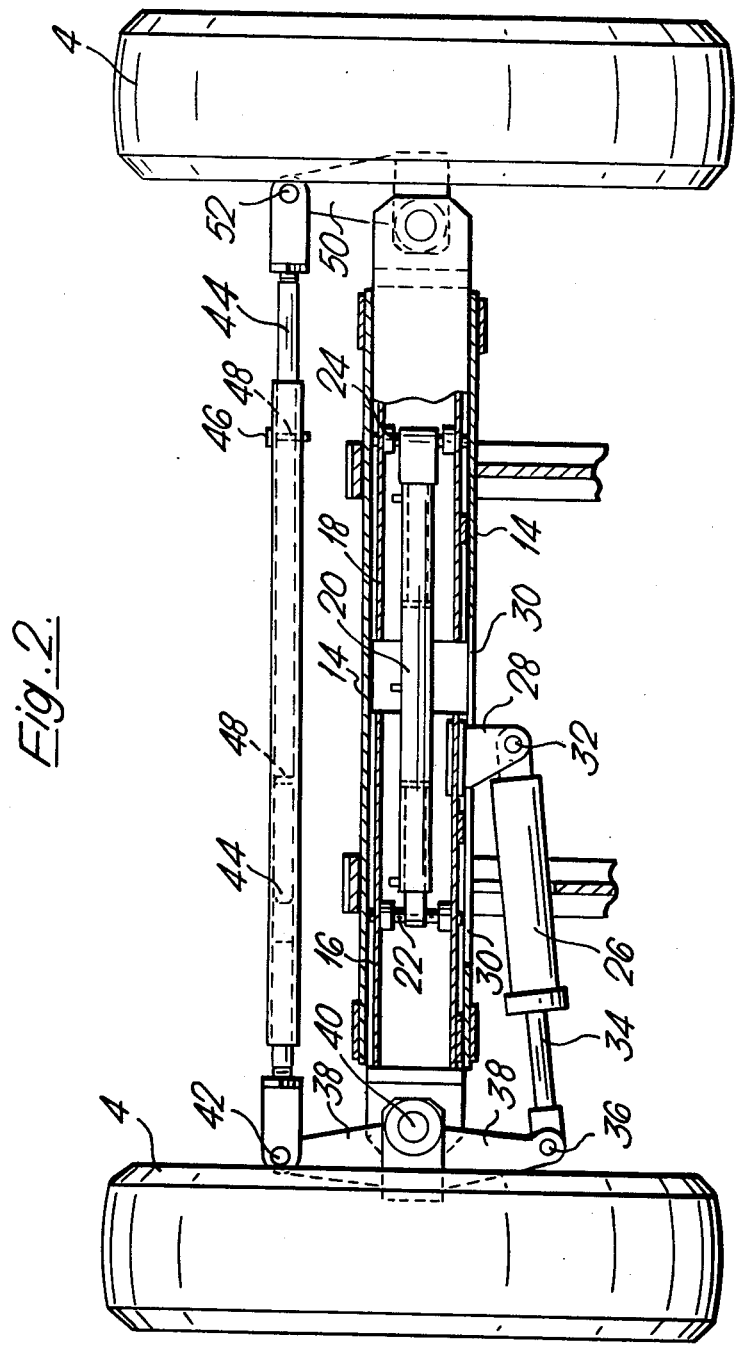
FIG. 2 is a top sectional view to an enlarged scale of the front axle of the vehicle shown in FIG. 1.

The front extending axle shown in detail in FIG. 2 comprises a cylindrical or rectangular section housing 14 carried by the main chassis 2 of the vehicle and carrying two axle beams 16 and 18, one at each side and each of which carries a wheel 4.

The two beams 16 and 18 are driven out from and into the cylindrical housing by a double acting hydraulic ram 20 located between the beams and pivotally connected thereto at 22 and 24.

A hydraulic steering actuator 26 is pivotally connected to the beam 16 through a bracket 28 which extends out through a slot 30 in the wall of the housing cylinder 14. Thus as the beam 16 is extended longitudinally out from the cylinder 14, the actuator 26 is also moved longitudinally outwardly for an equal distance.

The actuator cylinder is pivotted at 32 to the bracket 28, and the actuator piston 34 is pivotted at 36 to one end of one arm of a double arm steering arm or link 38 pivotted at 40 to the outer end of the beam 16 and carrying the stub axle (not shown) of the wheel 4.

The end of the other arm of the link 38 is pivotted at 42 to one end of a telescopically extensible track rod 44 mounted on the other side of the axle housing from the actuator.

Thus when the beams are extended the only operation which needs to be carried out is the pinning of the track rod in its extended position and equally on subsequent retraction, pinning the track rod in its retracted position. This is done by a removable pin 46 passing through one of two appropriately positioned holes 48 in the two parts of the telescopic track rod.

The right hand front wheel 4 is carried on a single arm or bracket 50 carried at the end of the beam 18. The outer end of the arm of the bracket is pivotally connected at 52 to the other end of the telescopic track rod 44 so that as the hydraulic actuator 26 operates to turn the left hand front wheel and the right hand front wheel is turned through an equal angle by the track rod.

The rear axle of the vehicle (not shown in detail) is not steerable. It is however extensible and comprises two beams each carrying a wheel and each telescopically mounted in a housing in a similar manner to the beams 14, 16 of the front axle. The rear beams are driven out and into their housing by a hydraulic ram similar to the ram 20 acting on the front beams. When the front and rear axles are in their extended or retracted positions, a microswitch operates to sense the position and operates to stop the hydraulic drive.

Locking pins may be provided to pin the axles in their extended and/or retracted position.

Unless the microswitches indicate that the axles are extended, the boom and lift angles will be limited.

The actuator is mounted within the confine of the chassis and so is not liable to be damaged.

I claim:

1. A mobile weight lifting vehicle comprising a chassis and a weight lifting boom mounted thereto,
forward and rearward axle means mounted to said chassis,
wheel mounting means mounted to said forward and rearward axle means,
at least one said axle means being of variable track width and comprising a pair of coaxially housed sliding beams each carrying pivotally mounted thereon wheel mounting means at one end and mounted in an axle housing,
means for extending and retracting said sliding beams within said axle housing,
a steering arm mounted to each said wheel mounting means,
means for adjustably connecting the steering arms to one another,
a steering actuator having first and second ends, said first end mounted to one of said sliding beams and said second end mounted to one of said steering arms, whereby on extension or retraction of said variable track width axle the distance between the first and second ends remains the same.

2. A vehicle as claimed in claim 1 wherein said steering actuator comprises an hydraulic ram having first and second ram ends, said first ram end mounted to a bracket extending from a said sliding beam, said bracket extending through a slot in said housing, said second ram end being pivotally connected to a steering arm.

3. A vehicle as claimed in claim 1 wherein said means for adjustably connecting opposed steering arms comprises a track rod comprising telescopically engaged members and removable pin means pinning said engaged members together at retracted and extended axle beam positions.

4. A vehicle as claimed in claim 1 wherein said extending and retracting means includes a double acting ram mounted between said sliding beams and with said housing.

5. A vehicle as claimed in claim 4 wherein said ram is pivotally connected to each said sliding beams.

6. A mobile weight lifting vehicle comprising a chassis and a weight lifting boom mounted thereto,
forward and rearward axle means mounted to said chassis,
wheel means mounted to said forward and rearward axle means,
at least one said axle means being of variable track width and comprising
a pair of coaxially mounted axle beams,
each said axle beams slidingly mounted in a housing mounted to said chassis,
one end of each axle beams being pivotally connected with wheel mounting means,
said wheel mounting means carrying a vehicle supporting wheel,
at least one said wheel mounting means having extending therefrom a steering arm,
said coaxial axle beams being interconnected by a ram,
an adjustable tracker rod linked between said opposed wheel mounting means,
a steering actuator pivotally connected at one end to at least one of said axle beams and at the other end to said steering arm,
whereby on powering said ram to vary the track width, the distance between the actuator connection to said at least one axle beam and the actuator connection to said steering arm remains the same.

7. An extendible steerable axle assembly mounted to the chassis of a vehicle comprising;
an axle housing including first and second movable axle beams mounted for movement along said housing, said axle beams having opposed inner ends and outwardly directed outer ends;
first and second wheels pivotably mounted to said outer ends of said first and second movable axle beams respectively;
means for adjustably positioning said movable axle beams along said axle housing to adjust the separation of said wheels; and
an extendible steering actuator having first and second ends, said first actuator end coupled to said first axle beam for movement therewith and said second actuator end steerably coupled to said first wheel so that actuation of said steering actuator changes the distance between said first and second actuator ends to steer said first wheel while movement of said first axle beam leaves said distance unaffected.

8. The axle assembly of claim 7 wherein said assembly includes a hollow housing within which said axle beams are housed.

9. The axle assembly of claim 7 wherein said axle beams positioning means includes a double acting hydraulic ram.

10. The axle assembly of claim 7 further comprising steering linkage means for steerably coupling said first second wheels so steering pivotal movement of one said wheels causes like steering pivotal movement of the other said wheel, said steering linkage means including an adjustable length member extending between said first and second wheels and means for selectively fixing the length of said rod to one of a plurality of chosen lengths.

11. The axle assembly of claim 10 wherein said steering linkage means includes a double arm steering link at said first wheel and a single arm steering link at said second wheel.

12. The axle assembly of claim 10 wherein said adjustable length member is a telescoping rod.

13. The axle assembly of claim 10 wherein said selective length fixing means includes a removable pin.

* * * * *